(12) United States Patent
Miller et al.

(10) Patent No.: US 12,017,751 B2
(45) Date of Patent: Jun. 25, 2024

(54) INLET FOR UNDUCTED PROPULSION SYSTEM

(71) Applicant: General Electric Company, Schenectady, NY (US)

(72) Inventors: Brandon Wayne Miller, Liberty Township, OH (US); David Marion Ostdiek, Liberty Township, OH (US); Darek Tomasz Zatorski, Fort Wright, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/475,744

(22) Filed: Sep. 15, 2021

(65) Prior Publication Data

US 2023/0085244 A1 Mar. 16, 2023

(51) Int. Cl.
| | | |
|---|---|---|
| *B64C 11/00* | (2006.01) | |
| *B64C 11/18* | (2006.01) | |
| *B64C 11/48* | (2006.01) | |
| *F01D 9/04* | (2006.01) | |
| *F01D 17/16* | (2006.01) | |
| *F02C 6/20* | (2006.01) | |
| *F02K 1/46* | (2006.01) | |
| *F02K 3/02* | (2006.01) | |
| *B64D 27/00* | (2006.01) | |

(52) U.S. Cl.
CPC ............ *B64C 11/001* (2013.01); *B64C 11/18* (2013.01); *B64C 11/48* (2013.01); *F01D 9/041* (2013.01); *F01D 17/16* (2013.01); *F02C 6/206* (2013.01); *F02K 1/46* (2013.01); *F02K 3/025* (2013.01); *B64D 2027/005* (2013.01); *F05B 2240/12* (2013.01); *F05B 2260/96* (2013.01); *F05D 2220/324* (2013.01); *F05D 2220/325* (2013.01); *F05D 2220/36* (2013.01); *F05D 2250/30* (2013.01); *F05D 2250/51* (2013.01); *F05D 2250/52* (2013.01); *F05D 2260/14* (2013.01)

(58) Field of Classification Search
CPC ....... B64C 11/001; B64C 11/48; B64C 11/18; F02C 7/042–057; F02C 9/18; F02C 6/206; F02K 3/025; F02K 1/46; F05D 2220/324; F05D 2220/325; F05D 2250/51; F01D 9/041; F01D 17/16
See application file for complete search history.

(56) References Cited

U.S. PATENT DOCUMENTS

| | | |
|---|---|---|
| 4,809,498 A | 3/1989 | Griffin, III et al. |
| 7,891,163 B2 | 2/2011 | Richards |
| 8,689,538 B2 | 4/2014 | Sankrithi et al. |
| 9,091,207 B2 * | 7/2015 | Chanez ................ F02C 7/05 |
| 9,587,561 B2 | 3/2017 | Snyder et al. |

(Continued)

*Primary Examiner* — Sang K Kim
(74) *Attorney, Agent, or Firm* — Dority & Manning, P.A.

(57) ABSTRACT

A propulsion system is provided including an unducted rotating fan defining a fan axis; and a turbomachine disposed downstream from the unducted rotating fan, wherein the turbomachine defines a working gas flowpath flowing therethrough; wherein the propulsion system defines a third stream flowpath and an inlet passage having an inlet that is offset from the fan axis, wherein the inlet passage is configured to provide an inlet airflow to the working gas flowpath, and wherein the third stream flowpath bypasses at least a portion of the turbomachine.

18 Claims, 8 Drawing Sheets

(56) References Cited

U.S. PATENT DOCUMENTS

| | | |
|---|---|---|
| 9,677,501 B2 | 6/2017 | Pierluissi et al. |
| 9,759,160 B2 | 9/2017 | Sankrithi et al. |
| 10,202,865 B2 | 2/2019 | Breeze-Stringfellow et al. |
| 10,364,750 B2 | 7/2019 | Rambo |
| 10,584,641 B2 | 3/2020 | Escure et al. |
| 10,704,410 B2 | 7/2020 | Zatorski et al. |
| 10,787,996 B2 | 9/2020 | Kupratis et al. |
| 11,035,293 B2 * | 6/2021 | Dubreuil ................ F02C 3/145 |
| 11,364,990 B2 * | 6/2022 | Lachance .............. B64C 11/385 |
| 2008/0253881 A1 * | 10/2008 | Richards ................ F02C 7/052 |
| | | 415/145 |
| 2011/0056208 A1 * | 3/2011 | Norris ....................... F02C 7/36 |
| | | 60/792 |
| 2014/0345253 A1 | 11/2014 | Dawson et al. |
| 2018/0128183 A1 * | 5/2018 | Escure .................. B64D 35/06 |
| 2019/0136710 A1 * | 5/2019 | Breeze-Stringfellow .................... |
| | | B64C 11/48 |
| 2020/0308979 A1 | 10/2020 | Zatorski et al. |
| 2021/0108597 A1 * | 4/2021 | Ostdiek ................. B64D 27/10 |

* cited by examiner

INLET FOR UNDUCTED PROPULSION SYSTEM

FIELD

The present disclosure generally relates to an unducted fan aircraft engine having an offset inlet.

BACKGROUND

A gas turbine engine generally includes a turbomachine and a rotor assembly. Gas turbine engines, such as turbofan engines, can be used for aircraft propulsion. In the case of a turbofan engine, the rotor assembly can be configured as a fan assembly.

Existing turbofan engines often include large fan diameters and large gearboxes which can cause issues with respect to under cowl packaging and with thermal management. Other issues with existing turbofan engines often include poor distortion tolerance and poor extraction of debris due to size and inlet design constraints. Improvements to turbofan engines to address these issues would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Figure 1:
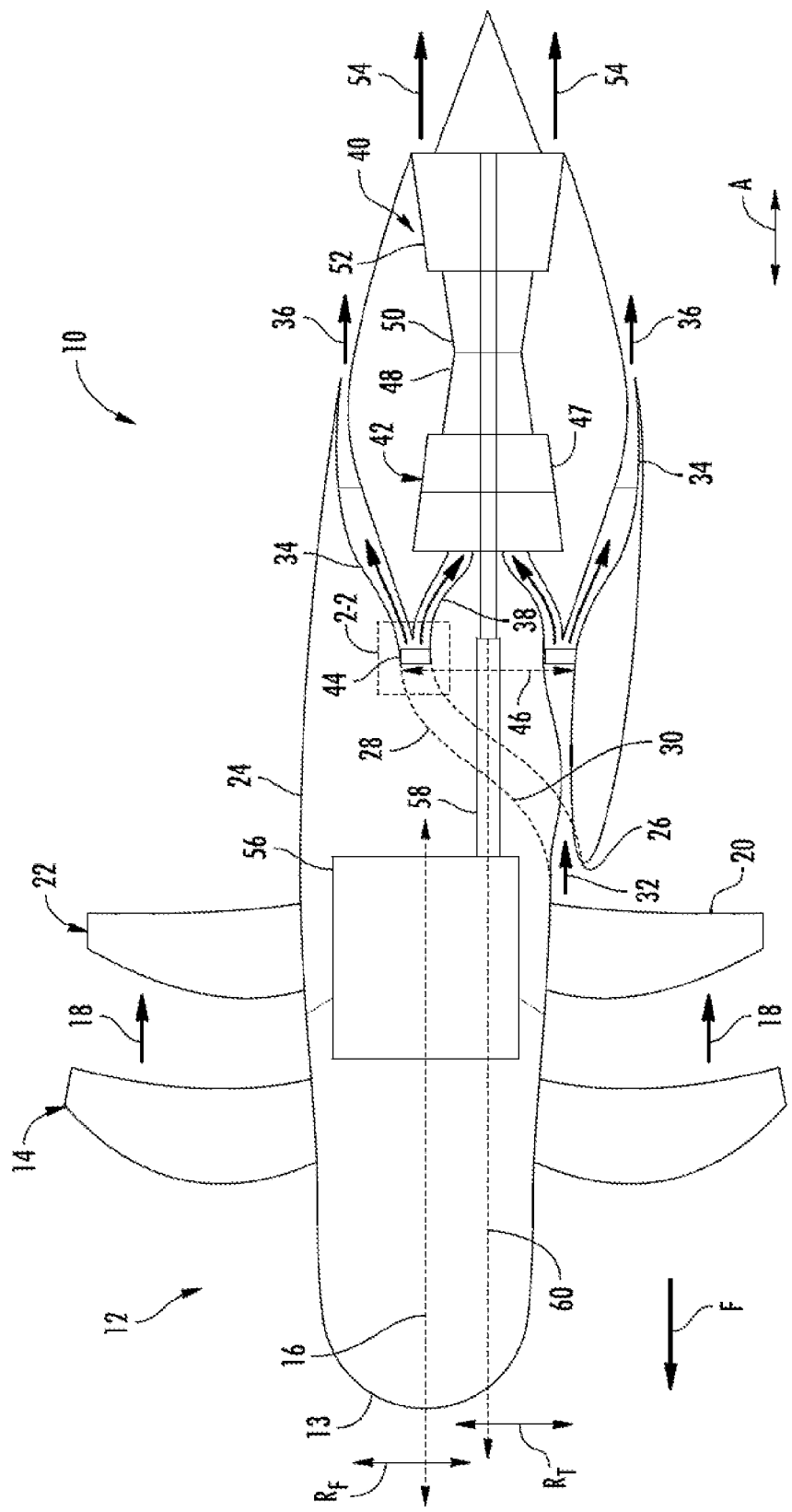
FIG. 1 is a cross-section view of a first propulsion system configured as an unducted turbofan engine with an offset inlet in accordance with an exemplary aspect of the present disclosure.

Repeat use of reference characters in the present specification and drawings is intended to represent the same or analogous features or elements of the present disclosure.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" can be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "distal" means situated furthest away from a point of origin or attachment, and the term "proximal" means situated closest to the point of origin or attachment.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language can correspond to the precision of an instrument for measuring the value, or the precision of the methods or machines for constructing or manufacturing the components and/or systems. For example, the approximating language can refer to being within a 1, 2, 4, 10, 15, or 20 percent margin. These approximating margins can apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A "third stream" as used herein means a non-primary air stream capable of increasing fluid energy to produce a minority of total propulsion system thrust. A pressure ratio of the third stream can be higher than that of the primary propulsion stream (e.g., a fan bypass or propeller driven propulsion stream). The thrust can be produced through a dedicated nozzle or through mixing of an airflow through the third stream with a primary propulsion stream or a core air stream, e.g., into a common nozzle.

In certain exemplary embodiments an operating temperature of the airflow through the third stream can be less than a maximum compressor discharge temperature for the engine, and more specifically can be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures can facilitate heat transfer to or from the airflow through the third stream and a separate fluid stream. Further, in certain exemplary embodiments, the airflow through the third stream can contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, can passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The present disclosure is generally related to a gas turbine engine having an unducted fan, and more specifically to a relative positioning between an engine inlet and a fan axis of the unducted fan of the engine. The proposed engine configuration includes a third-stream architecture to reduce a diameter of the unducted fan. Additionally, the engine inlet is offset from the fan axis. The offset engine inlet configuration enables an improved under cowl packaging arrangement as well as a reduced diameter fan. Moreover, such a combination of the third stream with the offset inlet may provide for an improved distortion tolerance and extraction of inlet debris.

The disclosed third stream engine configurations work by modifying the fan pressure ratio of the unducted fan such that the fan pressure ratio supports take-off and climb with a smaller diameter fan while preserving a low fan pressure ratio at cruise for improved propulsive efficiency.

Referring now to the drawings, wherein identical numerals indicate the same elements throughout the figures, FIG. 1 is a cross-section view of a propulsion system 10 and shows an unducted fan 12 (with a nose 13, fan blades 14, a fan axis 16, and a fan stream 18), guide vanes 20, a row 22 of guide vanes 20, a casing 24, an inlet 26, an inlet passage 28, an inlet surface 30, an inlet stream 32, a third stream flowpath 34, a third stream outlet flow 36, a working gas flowpath 38, a turbomachine 40 (with a compressor section 42 (including a mid-fan 44 with diameter 46 and high pressure compressor 47), a combustor 48, a turbine section 50, a turbine section 50, and an exhaust section 52), an exhaust stream 54, a load device 56, a shaft 58 (with a shaft axis 60), an axial direction A, a turbomachine radial direction $R_T$, and a fan radial direction $R_F$. For reference purposes, FIG. 1 also depicts a forward direction F with arrow F, which in turn instructs as to the forward and aft portions of propulsion system 10.

Propulsion system 10 is a gas turbine engine. In this example, propulsion system 10 defines axial direction A. Also in this example, unducted fan 12 defines fan radial direction $R_F$ and turbomachine 40 defines turbomachine radial direction $R_T$. As shown in FIG. 1, propulsion system 10 takes the form of an open rotor propulsion system with unducted fan 12 which includes an array or stage of fan blades 14 arranged around fan axis 16 of unducted fan 12. In such a manner, the propulsion system 10 may be referred to a single unducted rotor propulsion system 10.

In one example, propulsion system 10 may be connected to an aircraft, such as via a pylon to a wing of the aircraft. Propulsion system 10 may be configured to provide thrust for an aircraft to which propulsion system 10 is mounted to.

Unducted fan 12 is an unducted rotating fan configured to rotate about fan axis 16. Unducted fan 12 is mounted on an upstream end of propulsion system 10. Unducted fan 12 is operably coupled to and driven by torque delivered by load device 56. As shown in FIG. 1, unducted fan 12 is located forward of turbomachine 40 in a "puller" configuration. As is depicted, unducted fan 12 is driven by turbomachine 40, and more specifically, is driven by shaft 58. More specifically, still, propulsion system 10 in the embodiment shown in FIG. 1 includes load device 56, and unducted fan 12 is driven by shaft 58 of turbomachine 40 across load device 56. In such a manner, fan blades 14 of unducted fan 12 can rotate around fan axis 16 and generate thrust to propel propulsion system 10, and hence an aircraft to which propulsion system 10 is mounted, in forward direction F. Load device 56 can include a gearset for increasing or decreasing a rotational speed of shaft 58 relative to turbine section 50, such that unducted fan 12 can rotate at a slower or faster rotational speed than shaft 58.

As unducted fan 12 rotates, fan blades 14 create fan stream 18 and propels the air in fan stream to provide propulsive thrust, e.g., for the aircraft.

Fan blades 14 and guide vanes 20 are airfoils. Throughout this disclosure, fan blade 14 will be referred to in the plural form to reference a plurality of fan blades 14. Fan blades 14 are disposed along an exterior surface of fan 12 in typically an equally spaced relation in a circumferential direction around fan axis 16. Fan blades 14 are disposed to rotate with unducted fan 12 about fan axis 16. Fan blades 14 are disposed upstream from guide vanes 20. In some examples, fan blades 14, guide vanes 20, or both, can incorporate a pitch change mechanism such that the airfoils (e.g., fan blades 14, guide vanes 20) can be rotated with respect to an axis of pitch rotation either independently or in conjunction with one another. Such pitch change can be utilized to vary thrust and/or swirl effects under various operating conditions, including to adjust a magnitude or direction of thrust produced at fan blades 14, or to provide a thrust reversing feature which can be useful in certain operating conditions such as upon landing an aircraft, or to desirably adjust acoustic noise produced at least in part by fan blades 14, guide vanes 20, or aerodynamic interactions from fan blades 14 relative to guide vanes 20.

Fan axis 16 is a centerline axis of unducted fan 12. Fan axis 16 is disposed through an axial centerpoint of unducted fan 12.

Fan stream 18 is a flow of air or airflow produced from fan blades 14 of unducted fan 12. Fan stream 18 is defined at least in part by an exterior surface of casing 24.

Fan stream 18, third stream flowpath 34, and working gas flowpath 38 may each include exhaust nozzle structures. Such structures may include variable area structures, fixed-area structures, convergent-divergent nozzles, thrust vectoring structures, lobed exhaust mixers, or other suitable exhaust structures.

Guide vanes 20 extend from casing 24 and are positioned aft of unducted fan 12. Guide vanes 20 are stationary guide vanes. For example, guide vanes 20 can be mounted to casing 24 (e.g., a stationary frame or other mounting structure) and do not rotate relative to fan axis 16. Guide vanes 20 are arranged in typically an equally spaced relation in a circumferential direction (e.g., a circumferential direction extending about fan axis 16) around fan axis 16. As will be appreciated, guide vanes 20 can be configured for straightening out fan stream 18 (e.g., by reducing a swirl in fan stream 18) from unducted fan 12 to increase an efficiency of propulsion system 10. For example, guide vanes 20 can be sized, shaped, and configured to impart a counteracting swirl to fan stream 18 from fan blades 14 so that in a downstream direction aft of both rows of airfoils (e.g., fan blades 14, guide vanes 20) fan stream 18 has a greatly reduced degree of swirl, which can translate to an increased level of induced efficiency.

Row 22 is a row or stage of guide vanes 20. Row 22 of guide vanes 20 is disposed downstream from fan blades 14.

Casing 24 is a housing or fairing defining an exterior of propulsion system 10. Turbomachine 40 is generally housed in casing 24. Moreover, it will be appreciated that casing 24 defines at least in part inlet 26 and exhaust section 52 and includes working gas flowpath 38 extending between inlet 26 and exhaust section 52. Casing 24 provides structural and aerodynamic support for the components of propulsion system 10.

Inlet 26 is a fluidic port or opening. As shown in FIG. 1, inlet 26 is disposed aft (along axial direction A) of guide vanes 20, and provides a path for incoming atmospheric air (and a portion of fan stream 18) to enter inlet passage 28. Such a location can be advantageous for a variety of reasons, including management of icing performance as well as protecting inlet 26 from various objects and materials as can be encountered in operation. Inlet 26 receives and provides a flow of air into propulsion system 10, and in particular to third stream flowpath 34 and to turbomachine 40. As will be described in more detail below (e.g., with reference to FIGS. 4 and 5), inlet 26 is an offset inlet, defining a non-annular shape.

Inlet passage 28 is a passageway or pathway configured to transport a fluid (e.g., inlet stream 32). Inlet passage 28 is fluidly connected to and extends between inlet 26 and both third stream flowpath 34 and working gas flowpath 38. Inlet passage 28 receives inlet stream 32 from inlet 26 and delivers inlet stream 32 to both third stream flowpath 34 and to working gas flowpath 38.

Inlet surface 30 is an interior surface of inlet passage 28. Inlet surface 30 is disposed along a forward side of inlet passage 28. Inlet surface 30 assists in guiding inlet stream 32 as inlet stream 32 flows through inlet passage 28.

Inlet stream 32 is a flow of air or inlet airflow passing from inlet 26 through inlet passage 28. Inlet stream 32 is passed through and is contained within inlet passage 28.

Third stream flowpath 34 is a flowpath that bypasses at least in part turbomachine 40. Third stream flowpath 34 is disposed downstream from inlet passage 28 and outward along turbomachine radial direction $R_t$ from working gas flowpath 38. In certain embodiments, third stream flowpath 34 is in fluid communication with fan stream 18 via inlet 26 and inlet passage 28. In the embodiment depicted, third stream flowpath 34 is configured to receive a portion of inlet stream 32 from inlet passage 28 at a location downstream of mid-fan 44. More specifically, in the embodiment depicted, third stream flowpath 34 is configured to receive a portion of inlet stream 32 from inlet passage 28 at a location downstream of mid-fan 44 and upstream of high pressure compressor 47.

Third stream flowpath 34 is configured to receive fluid energy and provide such fluid energy to the fan stream 18 to produce a portion of total thrust of propulsion system 10. During operation, the propulsion system 10 is configured such that during operation a pressure of an airflow through the third stream flowpath 34 is higher than a pressure of the fan stream 18. In one embodiment, the third stream flowpath 34 can include a dedicated exhaust nozzle at an outlet end. In the embodiment shown, the airflow through the third stream flowpath 34 can be mixed with fan stream 18. Various embodiments of third stream flowpath 34 are configured to generate less than 50% of the total thrust of propulsion system 10. In certain embodiments, during operation third stream flowpath 34 is configured to generate 2% or more of the total thrust of propulsion system 10. In an embodiment, third stream flowpath 34 is configured to generate 2% or more of total thrust and up to 50% of total thrust at a takeoff condition, full load condition, or rated takeoff power condition. An exemplary rated takeoff power condition can be relative to sea level static flight at 86 degree Fahrenheit ambient temperature operating condition.

In certain embodiments, an operating temperature of air through third stream flowpath 34 is less than a maximum compressor discharge temperature of propulsion system 10. In a particular embodiment, the operating temperature of air through third stream flowpath 34 is less than approximately 350 degrees Fahrenheit. In another embodiment, the operating temperature of air through third stream flowpath 34 is less than approximately 250 degrees Fahrenheit. In still another embodiment, the operating temperature of air through third stream flowpath 34 is less than approximately 200 degrees Fahrenheit. In various embodiments, the operating temperature of air through third stream flowpath 34 is at least an ambient temperature, or at least the temperature of air entered into compressor section 42. It should be appreciated that ranges of operating temperatures through third stream flowpath 34 can allow heat transfer to or from third stream flowpath 34 and another flowpath (e.g., working gas flowpath 38).

It should be appreciated by those skilled in the art that third stream flowpath 34 is extended from working gas flowpath 38 upstream of combustor 48. In certain embodiments, third stream flowpath 34 is extended from downstream of unducted fan 12. In still various embodiments, third stream flowpath 34 is configured to allow the flow of air to egress propulsion system 10 to generate a portion of the total thrust of propulsion system 10 such as described herein.

Furthermore, it should be appreciated by those skilled in the art that third stream flowpath 34 differentiates from bleed circuits or other flowpaths at least in part via the egress of air as propulsive thrust.

Propulsion system 10 may be configured to passively adjust thrust output from third stream flowpath 34. In certain embodiments, propulsion system 10 may be configured to actively adjust thrust output from third stream flowpath 34, such as via adjusting fuel flow, electric machine loading, variable stators, variable inlet guide vanes, variable exhaust area or geometry, or fluidic features generally, and based on a desired performance relative to an operating condition.

Third stream outlet flow 36 is a flow of air passing out of third stream flowpath 34. Third stream outlet flow 36 is expelled out of and from third stream flowpath 34. Third stream outlet flow 36 provides a portion of thrust of propulsion system 10.

Working gas flowpath 38 is a flow of air passing from inlet passage 28 and through turbomachine 40. Working gas flowpath 38 is disposed in an interior of turbomachine 40 and is fluidly connected with inlet passage 28. Working gas flowpath 38 extends through at least mid-fan 44, compressor section 42, combustor 48, turbine section 50, and exhaust section 52. Working gas flowpath 38 provides a flow of air and/or gasses through turbomachine 40.

In the embodiment depicted in FIG. 1, propulsion system 10 includes turbomachine 40 with compressor section 42 having mid-fan 44, combustor 48, turbine section 50, exhaust section 52, and shaft 58 extending therebetween and connecting compressor section 42 and turbine section 50. Turbomachine 40 is disposed in casing 24 and downstream from unducted fan 12. Turbomachine 40 provides a rotational power to drive unducted fan 12.

Compressor section 42 is a section of turbomachine 40 that compresses the airflow through working gas flowpath 38 to deliver a high pressure air stream to combustor 48. In one example, compressor section 42 includes mid-fan 44 (which may be considered part of a low pressure compressor of the compressor section 42), and high pressure compressor 47. Compressor section 42, combustor 48, turbine section 50, and exhaust section 52 are generally positioned in a serial aerodynamic flow arrangement. Compressor section 42 compresses incoming air and increases a pressure of the air before delivering the pressurized air to the combustor 48.

Mid-fan 44 is disposed to rotate about shaft axis 60 to compress an airflow through the working gas flowpath 38. Mid-fan 44 is disposed on an upstream end of turbomachine 40 at least partially within the working gas flowpath 38 and is in fluid communication with inlet passage 28 and third stream flowpath 34, as will be explained further below. In one example, mid-fan 44 can be operably coupled to shaft 58. Mid-fan 44 compresses and propels air in a downstream direction through the working gas flowpath 38, and into third stream flowpath 34.

Diameter 46 is a diameter of mid-fan 44 defined by a distance between distal ends of tips of fan blades of mid-fan 44 opposite the shaft axis 60.

Combustor 48 is a section of turbomachine 40 configured to combust airflow received from compressor section 42. Combustor 48 is disposed between and is fluidly connected to compressor section 42 and turbine section 50. Combustor 48 can include one or more configurations for receiving a mixture of fuel and air and for providing a flow of combustion gasses through turbine section 50 for driving shaft 58.

In various embodiments, combustor 48 may be configured as a deflagrative combustion system or a detonative combustion system. Combustor 48 may include any suitable type of system for receiving a flow of liquid and/or gaseous fuel and generating hot gases, including, but not limited to, annular, can-annular, can, trapped vortex, volute or scroll, rotating detonation, pulse detonation, subsonic or supersonic combustion systems.

Turbine section 50 is a portion of turbomachine that is configured to convert and transfer energy from airflow flowing through turbine section 50 to rotational energy or torque into shaft 58. Turbine section 50 is disposed between and is fluidly connected to combustor 48 and exhaust section 52. Turbine section 50 is operably coupled to unducted fan 12 via shaft 58 and load device 56 to drive the one or more stages of fan blades 14 of unducted fan 12. Turbine section 50 receives a high speed flow of air from combustor 48 and converts energy from the high speed air into rotational energy of shaft 58.

Exhaust section 52 is a is a section of turbomachine 40 configured to expel exhaust stream 54 from propulsion system 10. Exhaust section 52 is disposed downstream from and is fluidly connected to turbine section 50. Exhaust section 52 expels air from propulsion system 10 to produce thrust for an aircraft propulsion system 10 is mounted to.

Exhaust stream 54 is a flow of air passing out of propulsion system 10 via exhaust section 52. Exhaust stream 54 flows out of exhaust section 52. Exhaust stream 54 provides a portion of the total thrust provided by propulsion system 10.

In this example, load device 56 is a gearbox. In other examples, load device 56 can include one or more of an electric machine, a mechanical drive device, or a fluid flow device. For instance, load device 56 can form an accessory gearbox, a reduction gear assembly, a fan pitch assembly, or a main gearbox assembly. Load device 56 can include one or more fuel pumps, electric machines (e.g., motors and/or generators, constant frequency or variable frequency machines, hybrid powertrains, etc.), lubricant pumps, hydraulic pumps, air compressors, engine starter, sensor drives, and auxiliary gearbox drives, or combinations thereof. Load device 56 is operably coupled to propulsion system 10 via shaft 58, or particularly a high speed spool connecting compressor section 42 and turbine section 50. Load device 56 transfers rotational energy from shaft 58 to unducted fan 12.

Shaft 58 is a rotating shaft. In one example, shaft 58 can be a low speed or low pressure shaft. For example, shaft 58 may be operably coupled to a low pressure turbine of the turbine section 50 of the turbomachine 40 for receiving rotational energy from the low pressure turbine and providing such rotational energy to the low pressure compressor, including the mid-fan 44, and to the fan 12 via load device 56. Shaft axis 60 is a centerline axis of shaft 58. Shaft axis 60 is disposed through a centerpoint of shaft 58 and is parallel to fan axis 16. Shaft 58 is rotatable with compressor section 42, turbine section 50, or both. Axial direction A is a direction set parallel to both fan axis 16 and shaft axis 60. Axial direction A is shown as left to right in FIG. 1. Fan radial direction $R_F$ is a direction set perpendicular to axial direction A and extends 360° about fan axis 16. Turbomachine radial direction $R_T$ is a direction set perpendicular to axial direction A and extends 360° about fan axis 60.

The proposed configuration of propulsion system 10 including a turbofan engine with unducted fan 12 and a third-stream architecture enables a reduction in a diameter of unducted fan 12. For example, with third stream flowpath 34 producing an extra amount of thrust via third stream outlet flow 36, a diameter of unducted fan 12 can be smaller because an amount of thrust required of unducted fan 12 is approximately reduced by the amount of thrust provided by third stream flowpath 34.

Additionally, propulsion system 10 including inlet 26 that is offset from fan axis 16 enables an improved an under cowl packaging arrangement. Other benefits of the combination of third stream flowpath 34 with inlet 26 being offset from fan axis 16 includes improved distortion tolerance and extraction of debris entering into inlet 26. For example, as debris enters into inlet passage 28, debris will continue on into third stream flowpath 34 due the momentum of debris causing the debris to continue along its line of motion and/or the swirling of the airflow from mid-fan 44 centrifuging the heavier debris outward relative to shaft axis 60. In comparison, the air flowing into inlet passage 28 with inlet stream 32 is curved and drawn into working gas flowpath 38. In this way, an amount of debris entering into turbomachine 40 may be reduced compared to a configuration without third stream flowpath 34. Moreover, third stream flowpath 34 provides both a thermal management function as well as additional thrust for propulsion system 10.

Figure 2:
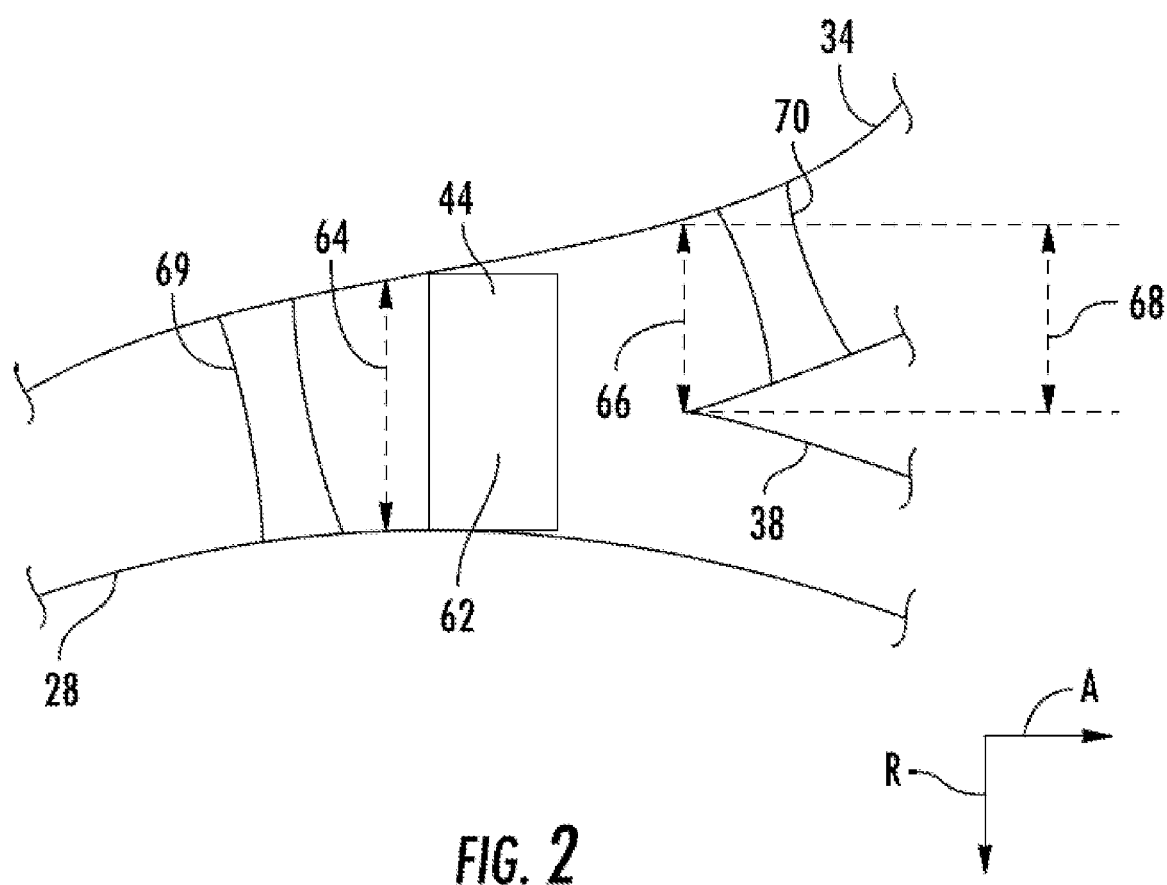
FIG. 2 is an enlarged isolation view of section 2-2 identified in FIG. 1 and shows a height of a third stream inlet and a blade span of a mid-fan rotor blade in accordance with an exemplary aspect of the present disclosure.

FIG. 2 is an enlarged isolation view of section 2-2 identified in FIG. 1 and shows inlet passage 28, third stream flowpath 34, working gas flowpath 38, mid-fan 44, a blade 62 (with a span 64), and a third stream inlet 66 (defining a height 68).

Blade 62 is an airfoil of mid-fan 44. In FIG. 2, a single blade 62 is shown. However, mid-fan 44 can include a plurality of blades 62 positioned annularly around shaft axis 60. In one example, blade 62 is mounted to a rotating hub disposed as part of compressor section 42. During operation, blade 62 (and other blades) rotates about shaft axis 60 (see e.g., FIG. 1) to propel air through working gas flowpath 38 and in the embodiment depicted, into third stream flowpath 34.

Span 64 is a length or height of blade 62. In one example, span 64 can be defined by a length between an interface of a root and an airfoil portion of blade 62 and a distal end or tip of blade 62. Span 64 is defined by a length of blade 62 along radial direction R.

Third stream inlet 66 is a beginning of third stream flowpath 34. Third stream inlet 66 is disposed at an upstream-most end of third stream flowpath 34 and is disposed downstream from blade 62 of mid-fan 44. Third stream inlet 66 receives the accelerated airflow from blade 62. In one example, third stream inlet 66 is an annular inlet. In another example, third stream inlet 66 is a non-annular inlet.

Height 68 is a length or distance along radial direction R of turbomachine 40 of third stream inlet 66. Height 68 is a radial height of third stream inlet 66. Height 68 is defined by a height of third stream inlet 66 along radial direction R. In one example, height 68 of third stream inlet 66 is at least 5% of span 64 of blade 62 and up to 50% of span 64 of blade 62 of mid-fan 44. In another example, height 68 of third stream inlet 66 is at least 10% of span 64 of blade 62 and up to 40% of span 64 of blade 62 of mid-fan 44.

With having height 68 of third stream inlet 66 at least 5% of height 68 and up to 50% of span 64 of blade 62, third stream flowpath can receive and take in a significant amount of debris contained in the airflow passing through inlet passage, that in other existing systems without third stream flowpath 34 would be ingested into an internal turbomachine.

In certain exemplary embodiments, inlet passage can include an inlet guide vane 69 and third stream flowpath 34 can include an outlet guide vane 70. Here, inlet guide vane 69 and outlet guide vane 70 are shown in phantom. In this example, inlet guide vane 69 and outlet guide vane 70 can be fixed geometry airfoils. In other examples, at least one of inlet guide vane 69 and outlet guide vane 70 can be variable geometry guide vanes.

It will be appreciated that the exemplary single unducted rotor propulsion system 10 depicted in FIGS. 1 and 2 is by way of example only, and that in other exemplary embodiments, propulsion system 10 can have any other suitable configuration, including, for example, any other suitable number of shafts or spools, turbines, compressors, etc.; a direct-drive configuration (i.e., without a gearbox); etc. For example, in other exemplary embodiments, propulsion system 10 can be a three-spool engine, having an intermediate speed compressor and/or turbine. In such a configuration, it will be appreciated that the terms "high" and "low," as used herein with respect to the speed and/or pressure of a turbine, compressor, or spool are terms of convenience to differentiate between the components, but do not require any specific relative speeds and/or pressures, and are not exclusive of additional compressors, turbines, and/or spools or shafts. Additionally, or alternatively, in other exemplary embodiments, propulsion system 10 can include a multi-stage open rotor configuration. Further, in still other exemplary embodiments, the turbomachine of the propulsion system may include one or more "reverse flow" portions, wherein the gas through the working gas flowpath flows in a forward direction. For example, in one or more of such embodiments, the turbomachine may include a reverse flow combustor, or the entire working gas flowpath may be configured in a reverse flow orientation.

Figure 3:
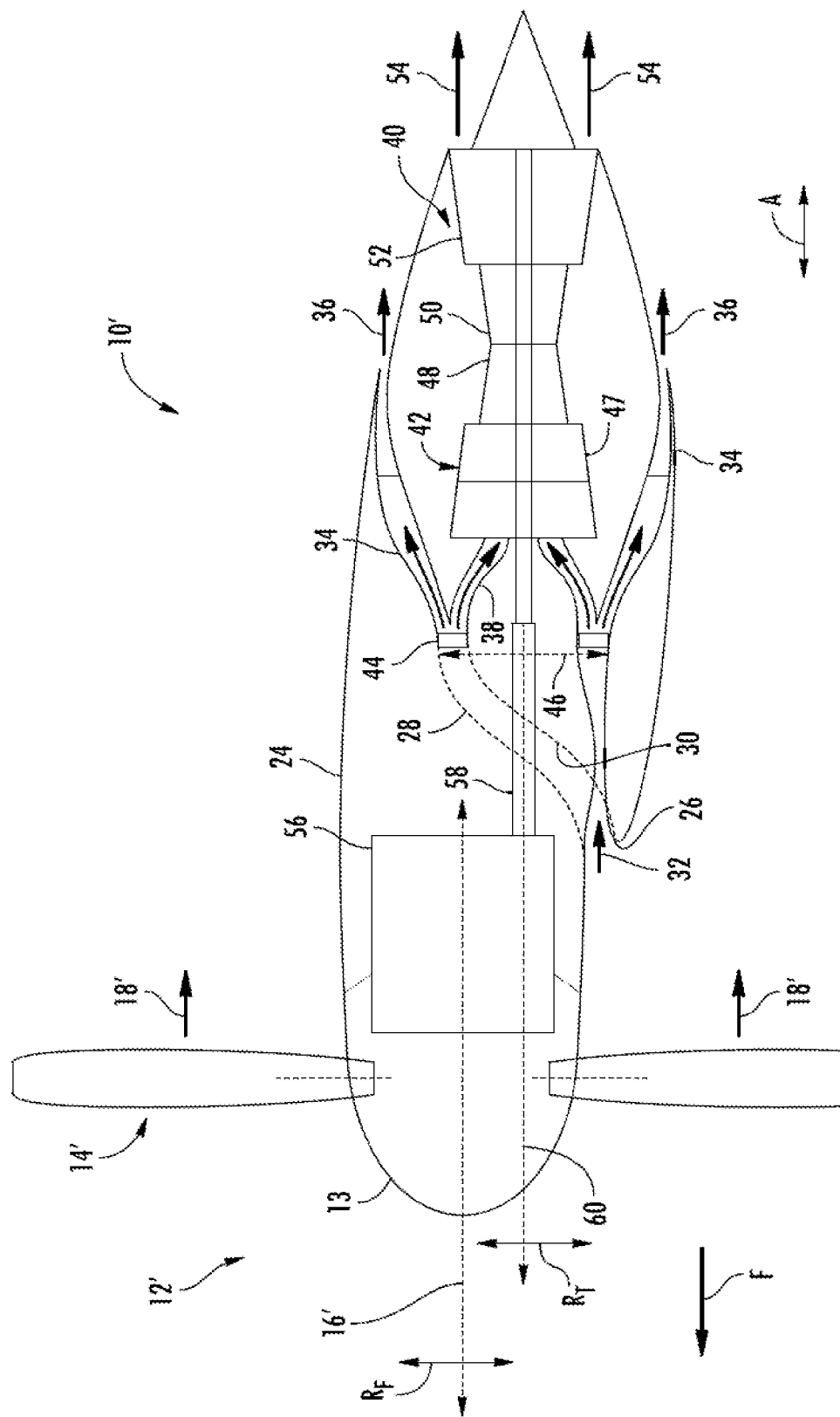
FIG. 3 is a cross-section view of a second propulsion system configured as a turboprop engine with an offset inlet in accordance with an exemplary aspect of the present disclosure.

For example, referring now to FIG. 3, a cross-section view of a propulsion system 10' is provided in accordance with another exemplary embodiment of the present disclosure. The exemplary propulsion system 10' of FIG. 3 may be configured in substantially the same manner as the exemplary propulsion system of FIG. 1. For example, the propulsion system of FIG. 3 shows a propeller 12' (with prop blades 14', a prop axis 16', and a prop stream 18'), a casing 24, an inlet 26, an inlet passage 28, an inlet surface 30, an inlet stream 32, a third stream flowpath 34, a third stream outlet flow 36, a working gas flowpath 38, a turbomachine 40 (with a compressor section 42 (including a mid-fan 44 with diameter 46 and high pressure compressor 47), a combustor 48, a turbine section 50, a turbine section 50, and an exhaust section 52), an exhaust stream 54, a load device 56, a shaft 58 (with a shaft axis 60), an axial direction A, a propeller radial direction $R_P$, and a turbomachine radial direction $R_T$. For reference purposes, FIG. 3 also depicts a forward direction F with arrow F, which in turn defines the forward and aft portions of propulsion system 10'.

However, for the exemplary embodiment of FIG. 3, the propulsion system is configured as a turboprop engine, with propeller 12' instead configured as propeller 12, without a stage of outlet guide vanes.

Propulsion system 10' is a gas turbine engine. In this example, propulsion system 10' is a configured as a single unducted rotor propulsion system 10' defining axial direction A. As shown in FIG. 3, propulsion system 10' takes the form of an open rotor propulsion system with propeller 12' which includes an array or stage of prop blades 14' arranged around prop axis 16' of propeller 12'.

Propeller 12' is a fan configured to rotate about prop axis 16'. Propeller 12' is mounted on an upstream end of propulsion system 10'. Propeller 12' is operably coupled to and driven by torque delivered by load device 56. As shown in FIG. 3, propeller 12' is located forward of turbomachine 40 in a "puller" configuration. As is depicted, propeller 12' is driven by turbomachine 40, and more specifically, is driven by shaft 58. More specifically, still, propulsion system 10' in the embodiment shown in FIG. 3 includes load device 56, and propeller 12' is driven by shaft 58 of turbomachine 40 across load device 56. In such a manner, prop blades 14' of propeller 12' can rotate around prop axis 16' and generate thrust to propel propulsion system 10', and hence an aircraft to which propulsion system 10' is mounted, in forward direction F. Load device 56 can include a gearset for increasing or decreasing a rotational speed of shaft 58 relative to turbine section 50, such that propeller 12' can rotate at a slower or faster rotational speed than shaft 58.

As propeller 12' rotates, prop blades 14' create prop stream 18' and propels the air in fan stream to provide propulsive thrust for the aircraft.

Prop blades 14' are airfoils. Throughout this disclosure, prop blade 14' will be referred to in the plural form to reference a plurality of prop blades 14'. Prop blades 14' are disposed along an exterior surface of propeller 12' in typically an equally spaced relation in a circumferential direction around prop axis 16'. Prop blades 14' are disposed to rotate with propeller 12' about prop axis 16'. Prop blades 14' are disposed upstream from inlet 26. In some examples, prop blades 14' can incorporate a pitch change mechanism such that the airfoils (e.g., prop blades 14') can be rotated with respect to an axis of pitch rotation either independently or in conjunction with one another. Such pitch change can be utilized to vary thrust and/or swirl effects under various operating conditions, including to adjust a magnitude or direction of thrust produced at prop blades 14', or to provide a thrust reversing feature which can be useful in certain operating conditions such as upon landing an aircraft, or to desirably adjust acoustic noise produced at least in part by prop blades 14'.

Prop axis 16' is a centerline axis of propeller 12'. Prop axis 16' is disposed through an axial centerpoint of propeller 12'. Prop stream 18' is a flow of air or airflow produced from prop blades 14' of propeller 12'. Prop stream 18', third stream flowpath 34, and working gas flowpath 38 may each include exhaust nozzle structures. Such structures may include variable area structures, fixed-area structures, convergent-divergent nozzles, thrust vectoring structures, lobed exhaust mixers, or other suitable exhaust structures.

In certain embodiments, third stream flowpath 34 is in fluid communication with prop stream 18' via inlet 26 and inlet passage 28.

Third stream flowpath 34 is configured to recover fluid energy to produce a portion of total thrust of propulsion system 10'. During operation, a pressure ratio of third stream flowpath 34 is higher than a pressure ratio at prop stream 18'. In one embodiment, the portion of total thrust produced through third stream flowpath 34 can include a dedicated exhaust nozzle at an outlet end. In another embodiment, the portion of total thrust produced through third stream flowpath 34 can be mixed with prop stream 18'. In still another embodiment, the portion of total thrust produced through third stream flowpath 34 can be mixed with working gas flowpath 38 downstream of combustor 48 and egressed through exhaust section 52. Various embodiments of third stream flowpath 34 are configured to generate less than 50% of the total thrust of propulsion system 10'. In certain embodiments, during operation third stream flowpath 34 is configured to generate 2% or more of the total thrust of propulsion system 10'. In an embodiment, third stream flowpath 34 is configured to generate 2% or more of total thrust and up to 50% of total thrust at a takeoff condition, full load condition, or rated takeoff power condition. An exemplary rated takeoff power condition can be relative to sea level static flight at 86 degree Fahrenheit ambient temperature operating condition.

Turbine section 50 is operably coupled to propeller 12' via shaft 58 and load device 56 to drive the one or more stages of prop blades 14' of propeller 12'. Load device 56 transfers rotational energy from shaft 58 to propeller 12'.

Shaft 58 is a rotating shaft. In one example, shaft 58 can be a low speed or low pressure shaft. Shaft 58 is operably coupled to turbomachine 40 and to drive load device 56. Shaft 58 transfers rotational energy from turbine section 50 to load device 56. Shaft axis 60 is a centerline axis of shaft 58. Shaft axis 60 is disposed through a centerpoint of shaft 58 and is parallel to prop axis 16'. Axial direction A is a direction set parallel to both prop axis 16' and shaft axis 60. Axial direction A is shown as left to right in FIG. 3. Propeller radial direction $R_P$ is a direction set perpendicular to axial direction A and to both prop axis 16'. Turbomachine radial direction $R_T$ is a direction set perpendicular to axial direction A and to shaft axis 60.

The proposed configuration of propulsion system 10' including a turbofan engine with propeller 12' and a third-stream architecture enables a reduction in a diameter of propeller 12'. For example, with third stream flowpath 34 producing an extra amount of thrust via third stream outlet flow 36, a diameter of propeller 12' can be smaller because an amount of thrust required of propeller 12' is approximately reduced by the amount of thrust provided by third stream flowpath 34.

As mentioned above a propulsion system 10 of the present disclosure includes an inlet 26 configured as an offset inlet, defining a non-annular shape. For example, referring now to FIG. 4, a front view is provided facing aft of propulsion system 10 and show an unducted fan 12 (with a nose 13, a fan axis 16, a casing 24, the inlet 26 (with a centerline axis 72), and an angular range θ.

Figure 4:
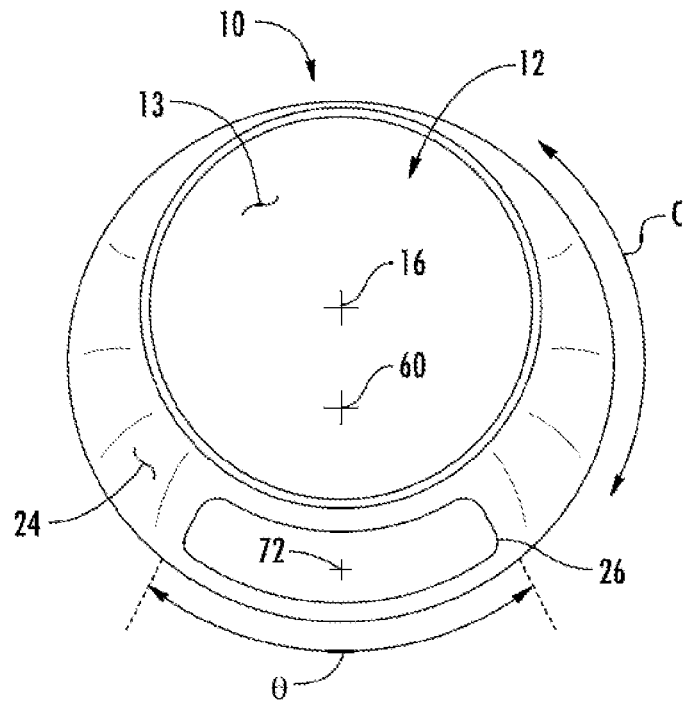
FIG. 4 is a front view facing aft of the propulsion system and shows a first inlet configuration in accordance with an exemplary aspect of the present disclosure.

In this example, fan blades 14 are omitted from unducted fan 12 for clarity. As shown here, propulsion system 10 includes a single inlet 26 disposed at a bottom of propulsion system 10 (with bottom shown as being downward in FIG. 4). In other examples, inlet 26 can be offset into a single discrete inlet, as shown in FIG. 4, or a plurality of discrete inlets (e.g., bifurcated). As discussed above, inlet 26 is fluidly connected to third stream flowpath 34 and to working gas flowpath 38 (see e.g., FIG. 1). As shown in FIG. 4, inlet 26 defines a non-annular shape. In some embodiments a single inlet (e.g., FIG. 4), or a plurality of inlets (e.g., FIG. 5) do not circumscribe, or surround the fan axis 16. In some embodiments, a single inlet or a plurality of inlets are proximal a shaft axis and distal a fan axis (e.g., in FIGS. 4 and 5, inlets 26, 26A, 26B are proximal and distal axes 60, 15 respectively).

Nose 13 is a spinner of unducted fan 12. Nose 13 is configured to rotate with unducted fan 12 about fan axis 16. Centerline axis 72 is an inlet centerline axis or axial centerline of inlet 26. In this example, centerline axis 72 passes into and out of the page. Likewise, fan axis 16 and shaft axis 60 are shown as pointing into and out of the page. Additionally, centerline axis 72 is located at a midpoint of inlet 26 along a circumferential direction of unducted fan 12 and at a midpoint of inlet 26 along a radial direction of unducted fan 12.

As shown in FIG. 4, inlet 26 extends in a circumferential direction C of propulsion system 10. Inlet 26 extends along a first portion of a circumference of propulsion system 10, with the first portion denoted by angular range θ. Angular range θ, as can be seen in FIG. 4, refers to an angle between imaginary reference lines extending between opposing ends of inlet 26 in the circumferential direction and shaft axis 60. Further, it will be appreciated that inlet 26 provides substantially all of an airflow to working gas flowpath 38 and third stream flowpath 34. In one example, angular range is less than or equal to 90° relative to shaft axis 60. In another example, angular range θ is less than or equal to 180° relative to shaft axis 60 (e.g., less than or equal to half of a total of the circumference of propulsion system 10). In yet another example, angular range θ is less than or equal to 270° relative to shaft axis 60. In such examples, centerline axis 72 on inlet 26 is disposed offset from fan axis 16 along a radial direction of unducted fan 12 from fan axis 16. Put another way, centerline axis 72 is offset from fan axis 16 such that fan axis 16 and centerline axis 72 are non-coaxial.

Also shown in FIG. 4, is the relative positioning between fan axis 16 and shaft axis 60. As can be seen in FIG. 4, fan axis 16 and shaft axis 60 of shaft 58 (see e.g., FIGS. 1 & 3) are offset from each other along a radial direction of propulsion system 10 and such that fan axis 16 and shaft axis 60 are non-coaxial.

It will be appreciated that the exemplary propulsion system 10 depicted in FIG. 4 is by way of example only, and that in other exemplary embodiments, FIG. 4 can instead depict propulsion system 10' with propeller 12' and without guide vanes 20 (see e.g., FIG. 3).

Further, it will be appreciated that inlet 26 may have any other suitable configuration. For example, referring now to FIG. 5, a front view facing aft of propulsion system 10 is provided showing a propulsion system 10 in accordance with another exemplary embodiment of the present disclosure. For the embodiment of FIG. 5, the propulsion system 10 includes an unducted fan 12 (with a nose 13), a fan axis 16, a casing 24, a first inlet 26A (with a first centerline axis 72A), a second inlet 26B (with a second centerline axis 72B), and an angular range θ.

Figure 5:
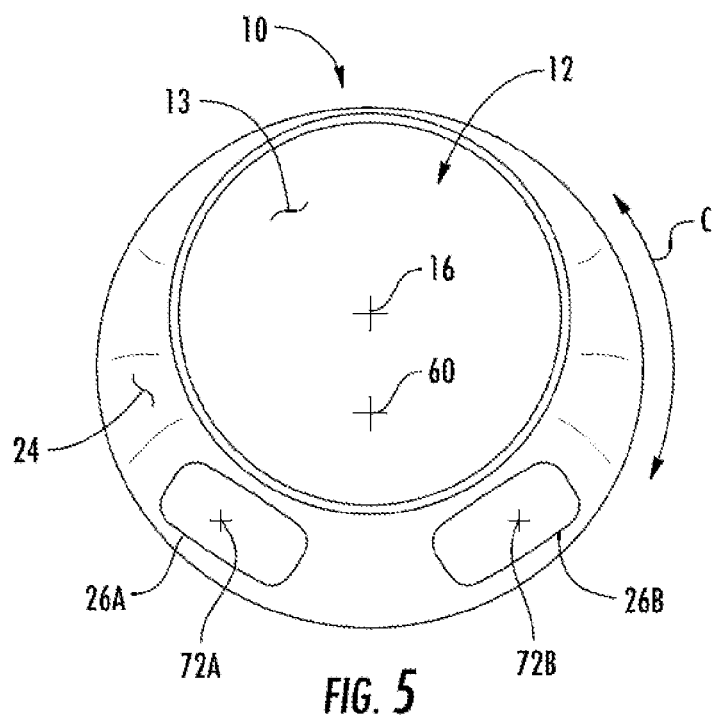
FIG. 5 is a front view facing aft of the propulsion system and shows a second inlet configuration in accordance with an exemplary aspect of the present disclosure.

In the example shown here in FIG. 5, propulsion system 10 includes two inlets 26 including first inlet 26A and second inlet 26B. In other examples, propulsion system 10 can include more or less than two discrete inlets 26 circumferentially spaced around nose 13.

First inlet 26A and second inlet 26B are two separate and discrete inlets 26 that are positioned a distance away from each other along circumferential direction C of propulsion system 10. Both of first centerline axis 72A and second centerline axis 72B are disposed offset from fan axis 16 along a radial direction of unducted fan 12. Put another way, first centerline axis 72A and second centerline axis 72B are non-coaxial with fan axis 16. For the embodiment of FIG. 5, each of inlets 26A, 26B are positioned in a bottom half of the propulsion system 10 (defined relative to a height of the casing 24 at the axial location depicted), and together define an angular range θ (not labeled) similar to angular range θ described above with reference to FIG. 4. The angular range θ of FIG. 5 extends from a far end of first inlet 26A to a far end of second inlet 26B. In other examples, each of inlets 26A, 26B can be positioned at any angular position relative to either fan axis 16 or shaft axis 60.

Figure 6:
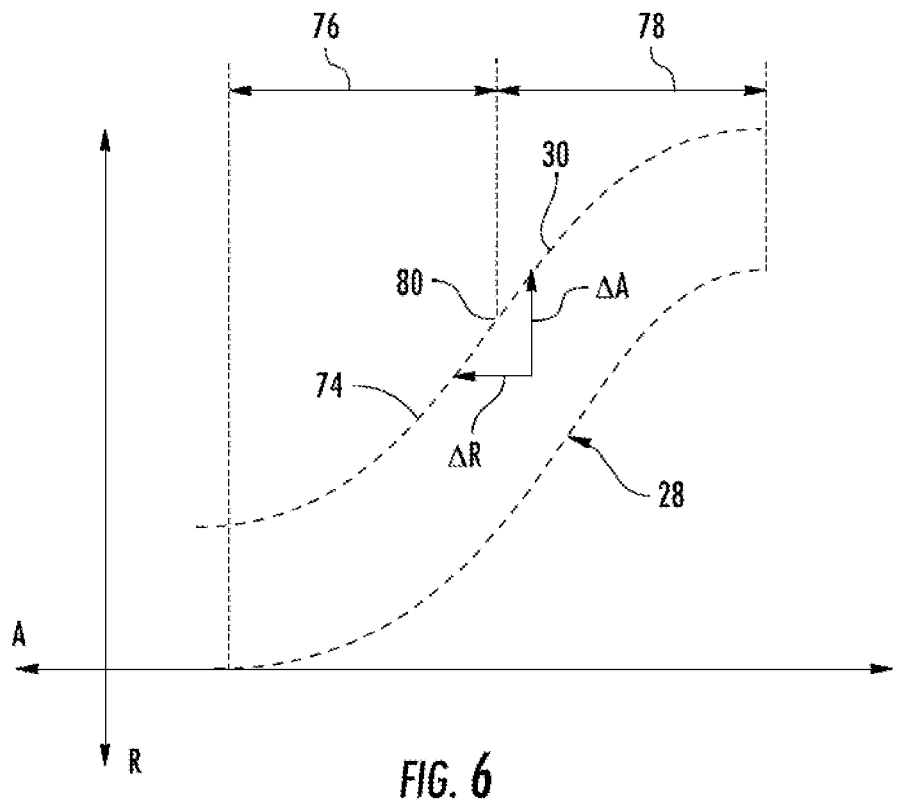
FIG. 6 is a graph showing a curvature of an inlet surface of the offset inlet of the propulsion system in accordance with an exemplary aspect of the present disclosure.

FIG. 6 is a graph showing a portion of inlet passage 28, and more particularly showing a curvature 74 of inlet surface 30 of inlet 26 of propulsion system 10. FIG. 6 shows a curvature 74 (with a first portion 76 and a second portion 78), and an inflection point 80.

Curvature 74 is a curved shape of inlet surface 30. First portion 76 is an initial or upstream section of curvature 74. In this example, first portion 76 is concave-up (upward as shown in FIG. 6). Second portion 78 is a secondary or downstream portion of curvature 74. In this example, second portion 78 of curvature 74 is concave-down (downward as shown in FIG. 6). Inflection point 80 is a point along curvature 74 located at an interface between first portion 76 and second portion 78. In this example, inflection point 80 is located at a transition point of first portion 76 that is concave-up and second portion 78 that is concave-down.

In the examples disclosed herein (see FIGS. 1-3), inlet surface 30 defines curvature 74 and a slope X defined by Equation 1.1.

$$X = \Delta R / \Delta A \qquad \text{Equation 1.1}$$

Here, $\Delta R$ is a change in a first length along turbomachine radial direction $R_T$ of propulsion system 10 and $\Delta A$ is a change in a second length along axial direction A of propulsion system 10. Notably, slope X is a local slope defined at the inflection point 80, and more specifically, in the embodiment shown, the slope X is the maximum slope of the inlet surface 30.

As will be appreciated from the description herein, certain embodiments of the present disclosure having the offset inlet, include a third stream inlet at a location immediately downstream of the mid-fan (e.g., at a location downstream from mid-fan 44 closer to mid-fan 44 than a first stage of the next stage of compressor rotor blades). A height of the inlet of the third stream flowpath may allow for a higher slope as compared to existing configurations, as the outer portion of the airflow through inlet passage 28, which may separate from inlet surface 30 as a result of the high slope X (creating a relatively high amount of turbulence in the airflow), is ingested into the third stream flowpath, and the inner portion of the airflow through inlet passage 28 which may have a relatively low amount of turbulence is ingested into the downstream portions of the turbomachine. The increased slope X enabled by such a configuration may allow for desired packaging of the propulsion system 10.

In one example, inflection point 80 is defined by a location along inlet surface 30 at which a second derivative of an equation of best fit of the curvature of inlet surface 30 equals zero. In another example, inflection point 80 is disposed at a point along the curvature where a second derivative of the equation of best fit is an isolated zero and changes sign. In such examples, the equation of best fit can be a logistic function (e.g., to match a shape or curvature of inlet surface 30 as shown in FIGS. 1-3).

Here, because propulsion system 10 with offset inlet 26 provides the benefit of debris extraction before the flow of air enters into the working gas flowpath 38, the slop of inlet passage 28 can be greater than enabled by existing propulsion systems without offset inlet 26.

Figure 7:
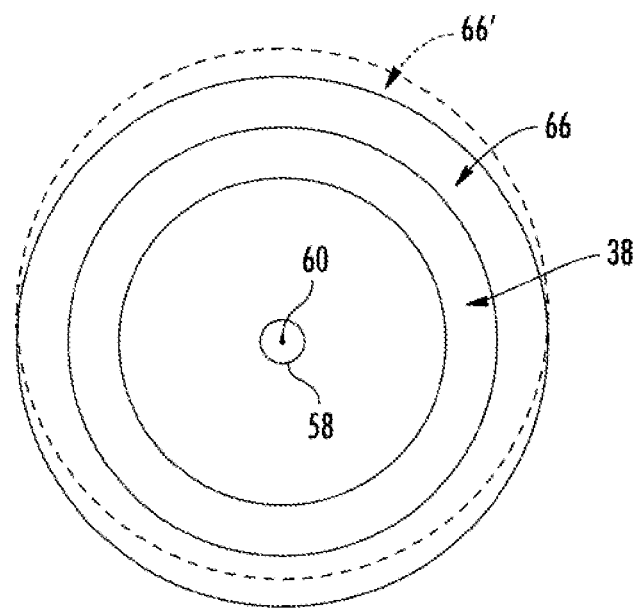
FIG. 7 is a front view facing aft at an inlet of a third stream of the propulsion system in accordance with an exemplary aspect of the present disclosure.

Referring now briefly to FIG. 7, a view along shaft axis 60 of the exemplary propulsion system 10 of FIG. 1 is provided at third stream inlet 66. It will be appreciated that in the embodiment of FIG. 7, third stream inlet 66 is an annular inlet, substantially symmetrical about the shaft axis 60. However, as is depicted in phantom, in certain exemplary aspects, third stream inlet 66' may be non-annular, or rather not symmetrical about the shaft axis 60. With such a configuration, third stream inlet 66' may define a greater height at a top end of the propulsion system 10 as compared to at a bottom end of propulsion system 10 (e.g., between 5% greater and 15% greater, such as at least 10% greater, 15%, greater, or 20% greater) so as to accommodate a greater amount of relatively high-turbulent airflow at the top end due to potential separation of the airflow from inlet surface 30.

Figure 8:
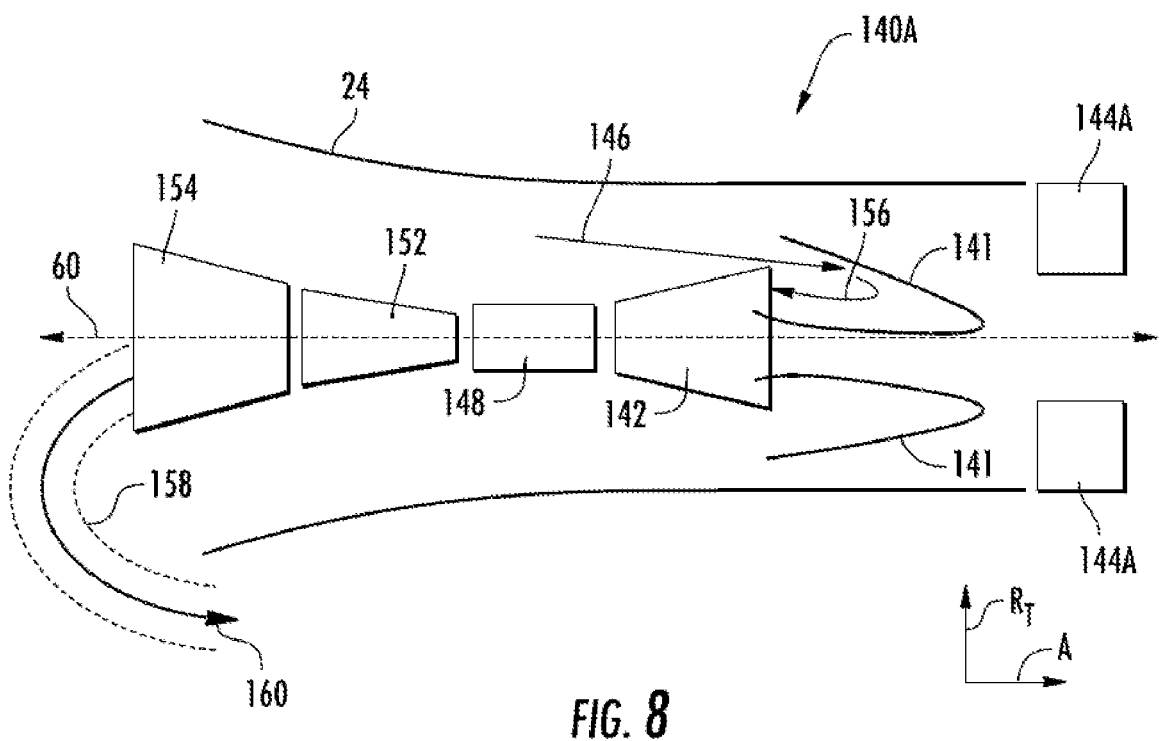
FIG. 8 is a cross-section view of a turbomachine a with first reverse flow configuration in accordance with an exemplary aspect of the present disclosure.

Referring now to FIG. 8, FIG. 8 is a cross-section view of a turbomachine 140A with first reverse flow configuration in accordance with an exemplary aspect of the present disclosure.

In certain exemplary embodiments, turbomachine 140A includes one or more "reverse flow" portions, wherein the working gas flowpath flows in a forward direction (e.g., to the left as shown in FIG. 8). For example, in one or more of such embodiments, turbomachine 140A may be configured such that the entire working gas flowpath is configured in a reverse flow orientation. Turbomachine 140A defines an axial direction A and a turbomachine radial direction $R_T$. In this exemplary embodiment, turbomachine 140A may be disposed in casing 24 of propulsion system 10.

Turbomachine 140A includes flow reversers 141. Flow reversers 141 are disposed to reverse a direction of a working gas airflow 146 from a rearward direction (e.g., left-to-right along axial direction A as shown in FIG. 8) to a forward direction (e.g., right-to-left along axial direction A as shown in FIG. 8). In certain exemplary embodiments, flow reversers 141 may be mounted to a non-rotating structural component of propulsion system 10. Additionally, or alternatively, in other exemplary embodiments, flow reversers 141 can include one or more flow reversers disposed around shaft axis 60.

Turbomachine 140A also includes a compressor section 142. In this exemplary embodiment, compressor section 142 is disposed on a rearward end of turbomachine 140A (e.g., a right end of turbomachine 140A as shown in FIG. 8), aft of a combustor 148. During operation, compressor section 142 receives a portion of working gas airflow 146 in the form of a reverse inlet flow 156. In certain exemplary embodiments, reverse inlet flow 156 is a portion of working gas airflow 146 that is fed into and is reversed by one or more flow reversers 141.

Turbomachine 140A additionally includes a fan 144A. In certain exemplary embodiments, fan 144A may be referred to as a mid-fan or a third stream fan. In this exemplary embodiment, fan 144A is disposed aft of compressor section 142 (e.g., to the right of compressor section 142 along axial direction A). It will be appreciated, however, that in other exemplary embodiments, fan 144A can be disposed at other locations relative to compressor section 142 along shaft axis 60 (see e.g., FIGS. 9-10).

Turbomachine 140A further includes combustor 148. Combustor 148 may be configured in substantially the same manner as combustor 148 from FIGS. 1 and 3, with the exception of receiving and sending working gas airflow 146 in a forward direction (e.g., to the left as shown in FIG. 8).

Turbomachine 140A also includes a high pressure turbine 152 and a low pressure turbine 154. High pressure turbine 152 and low pressure turbine 154 are fluidly connected to and are configured to receive working gas airflow 146 from combustor 148. Together, high pressure turbine 152 and low pressure turbine 154 form a turbine section of turbomachine 140A.

Turbomachine 140A further includes an exhaust duct 158 in fluid communication with low pressure turbine 154. Exhaust duct 158 is disposed to receive an exhaust stream 160 from low pressure turbine 154. In certain exemplary embodiments, exhaust duct 158 is configured to collect exhaust stream 160 along 360° of a forward end of low pressure turbine 154. In yet other exemplary embodiments, exhaust duct 158 may be configured to expel an exhaust stream 160 along 360° of turbomachine 140A or through one or more discretized openings disposed along casing 24 (see e.g., inlets 26A and 26B in FIG. 5).

It will be appreciated that turbomachine 140A may be used in combination with propulsion system 10 shown in FIG. 1 and propulsion system 10' in FIG. 3 above, such as for example in place of turbomachine 40. More specifically, in at least certain exemplary aspects, shaft axis 60 (e.g., the rotating shaft) of turbomachine 140A may be offset from the fan axis of the propulsion system (e.g., fan axis 16' of propulsion system 10' shown in FIG. 3) such that shaft axis 60 of turbomachine 140A is disposed at a first distance from the fan axis. It will also be appreciated that the reverse flow configurations discussed herein may be incorporated into single spool or dual spool machines.

Here, the embodiment of turbomachine 140A provided in and discussed with respect to FIG. 8 provides a useful configuration when a size of a core of turbomachine 140A is relatively small compared with larger sized turbomachines. For example, with a smaller turbomachine 140A, a correspondingly smaller third stream inlet provides less challenges with reversing the flow of working gas airflow 146. Additionally, a reverse flow configuration, such as that presented by turbomachine 140A, provides advantages of improved inlet separation and distortion mitigation throughout propulsion system 10' (see e.g., FIG. 3).

Figure 9:
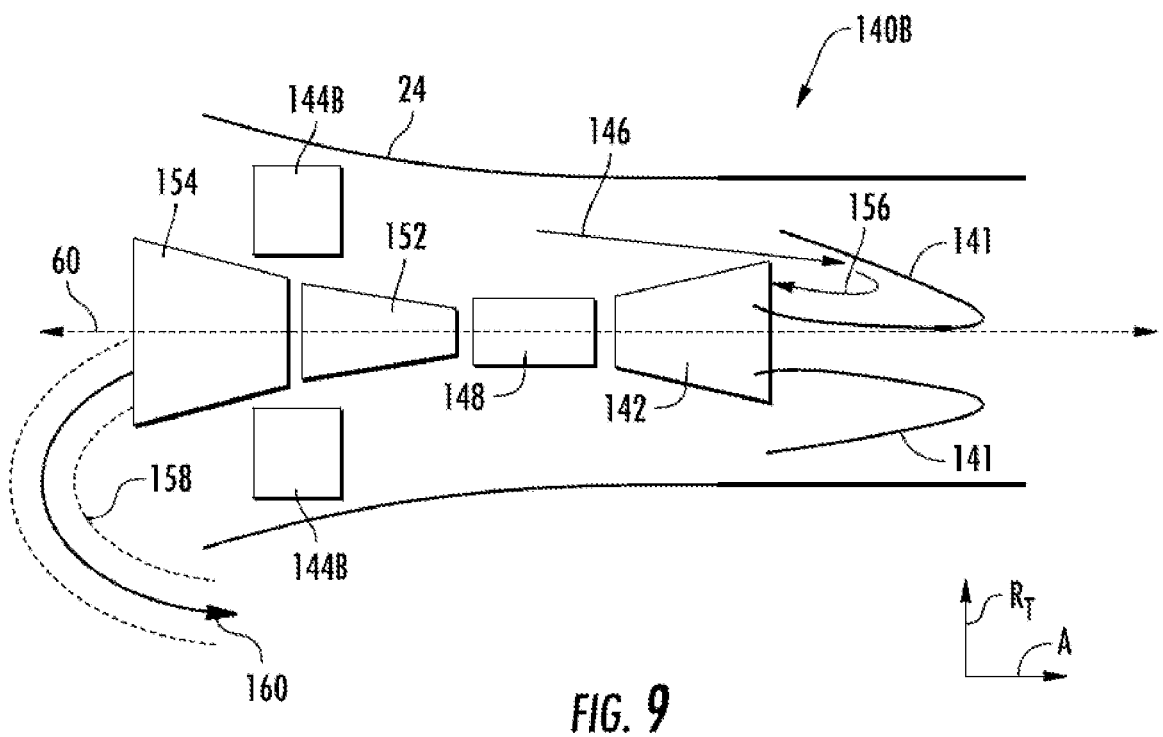
FIG. 9 is a cross-section view of a turbomachine a with second reverse flow configuration in accordance with an exemplary aspect of the present disclosure.

Referring now to FIG. 9, FIG. 9 is a cross-section view of a turbomachine 140B with a second reverse flow configuration in accordance with an exemplary aspect of the present disclosure. The embodiment provided in FIG. 9 may be configured in substantially the same manner as described in regard to FIG. 8, with a different placement of a fan 144B.

In this exemplary embodiment, fan 144B is disposed in a forward position that is forward (e.g., to the left as shown in FIG. 9) along axial direction A from compressor section 142. More specifically, in at least certain exemplary aspects, fan 144B is aligned along a radial direction R of turbomachine 140B with a portion of high pressure turbine 152 and a portion of low pressure turbine 154.

Figure 10:
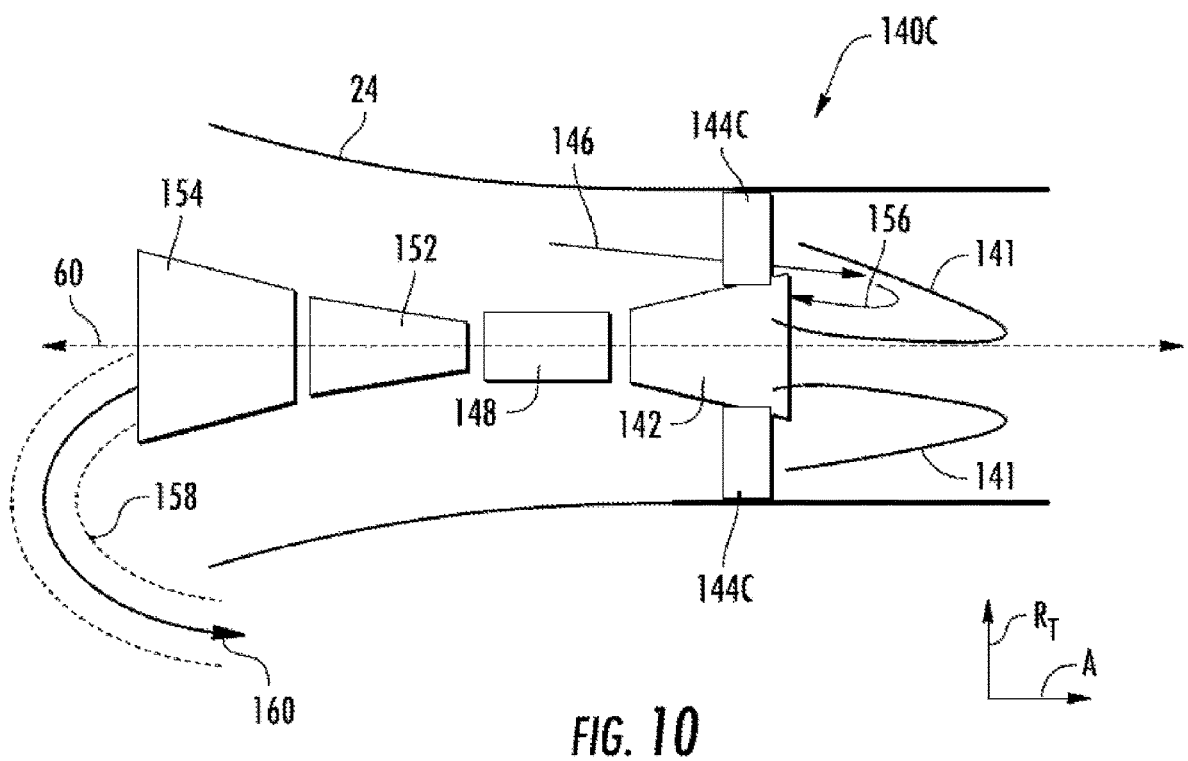
FIG. 10 is a cross-section view of a turbomachine with a third reverse flow configuration in accordance with an exemplary aspect of the present disclosure.

Referring now to FIG. 10, FIG. 10 is a cross-section view of a turbomachine 140C with a third reverse flow configuration in accordance with an exemplary aspect of the present disclosure. The embodiment provided in FIG. 10 may be configured in substantially the same manner as described in regard to FIG. 9, with a different placement of a fan 144C.

In this exemplary embodiment provided in FIG. 10, fan 144C is disposed in alignment along axial direction A with compressor section 142. In certain exemplary embodiments, fan 144C can be configured as a blade-on-fan. More specifically, in at least certain exemplary aspects, blades of fan 144C are radially outward of and directly connected to rotating fan blades of compressor section 142, with the fan blades of compressor section 142 being mounted to a disk of compressor section 142 that is mounted to a shaft of turbomachine 140C.

Here, the fan-on-blade configuration of fan 144C provides adjustments in a pressure and a temperature of the working fluid flowing across compressor section 142 and fan 144C that may be desirable in certain engine types and desired use cases.

Figure 11:
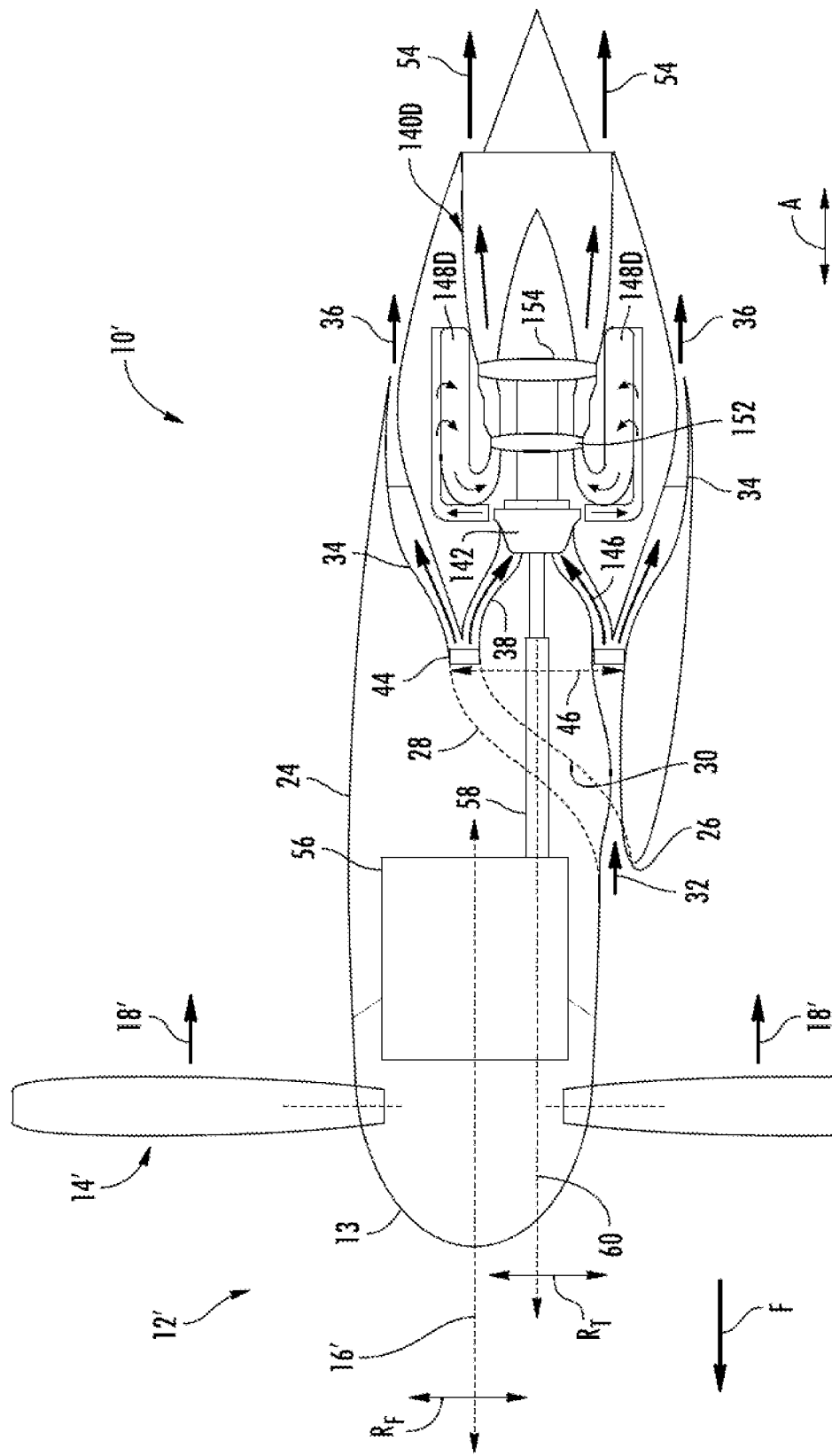
FIG. 11 is a cross-section view of a propulsion system with a turbomachine including a fourth reverse flow configuration in accordance with an exemplary aspect of the present disclosure.

Referring now to FIG. 11, FIG. 11 is a cross-section view of a propulsion system 10' with a turbomachine 140D including a fourth reverse flow configuration in accordance with an exemplary aspect of the present disclosure.

The embodiment of propulsion system 10' provided in FIG. 11 may be configured in substantially the same manner as described in regard to FIG. 3 wherein identical numerals indicate the same elements between the figures, with turbomachine 140D in place of turbomachine 40.

In certain exemplary embodiments, turbomachine 140D includes a type of reverse flow configuration. More specifically, in at least certain exemplary aspects, a combustor 148D of turbomachine 140D is configured to direct working gas airflow 146 in a forward direction (e.g., right-to-left as shown in FIG. 11) while both of compressor section 142 and the turbine section (e.g., high pressure turbine 152 and low pressure turbine 154) are configured to direct working gas airflow 146 in a rearward direction (e.g., left-to-right as shown in FIG. 11)

This written description uses examples to disclose the present disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A propulsion system comprising: an unducted rotating fan defining a fan axis; and a turbomachine disposed downstream from the unducted rotating fan, wherein the turbomachine defines a working gas flowpath flowing therethrough; wherein the propulsion system defines a third stream flowpath and an inlet passage having an inlet that is offset from the fan axis, wherein the inlet passage is configured to provide an inlet airflow to the working gas flowpath, and wherein the third stream flowpath bypasses at least a portion of the turbomachine.

The propulsion system of one or more of these clauses, wherein the propulsion system further comprises: a gearbox operably coupled to the unducted rotating fan; and a rotating shaft extending from the turbomachine and connected to the gearbox, wherein the gearbox is operably coupled to the turbomachine via the rotating shaft, wherein the rotating shaft defines a shaft axis.

The propulsion system of one or more of these clauses, wherein the rotating shaft is offset from the fan axis such that the rotating shaft is disposed at a first distance from the fan axis.

The propulsion system of one or more of these clauses, wherein the turbomachine comprises a compressor section having a mid-fan with a mid-fan blade, wherein the propulsion system comprises an inlet surface defining in part the inlet passage, wherein the inlet surface defines a curvature comprising an inflection point disposed at a point along the curvature.

The propulsion system of one or more of these clauses, wherein the propulsion system comprises an inlet surface defining in part the inlet passage, wherein the inlet surface defines a curvature, wherein the curvature comprises an inflection point, wherein the curvature of the inlet surface includes a first portion and a second portion, wherein the first portion is concave-up, wherein the second portion is concave-down, wherein the inflection point is located at a transition point of the first portion that is concave-up and the second portion that is concave-down.

The propulsion system of one or more of these clauses, wherein the inlet of the inlet passage defines a non-annular shape.

The propulsion system of one or more of these clauses, wherein the propulsion system defines a forward direction and a rearward direction, wherein the unducted rotating fan is configured to push a fan stream in the rearward direction, wherein at least a portion of the turbomachine is disposed in a reverse flow arrangement such that the turbomachine is configured to direct a portion of the working gas flowpath in the forward direction.

The propulsion system of one or more of these clauses, further comprising a row of stationary guide vanes disposed downstream from the unducted rotating fan and upstream from the turbomachine.

The propulsion system of one or more of these clauses, wherein the turbomachine comprises a compressor section having a mid-fan, wherein the third stream flowpath is configured to receive a portion of the inlet airflow from the inlet passage at a location downstream of the mid-fan.

The propulsion system of one or more of these clauses, wherein the third stream flowpath defines a third stream inlet having a radial height, wherein the mid-fan defines a blade span, and wherein the radial height of the third stream inlet is at least 5% of the blade span of the mid-fan and up to 50% of the blade span of the mid-fan.

The propulsion system of one or more of these clauses, wherein the turbomachine comprises a compressor section having a mid-fan and a high pressure compressor, wherein the third stream flowpath is configured to receive a portion of the inlet airflow from the inlet passage at a location downstream of the mid-fan and upstream of the high pressure compressor.

The propulsion system of one or more of these clauses, wherein the third stream flowpath defines a third stream inlet, wherein the third stream inlet is a non-annular inlet.

The propulsion system of one or more of these clauses, wherein the turbomachine comprises: a compressor section; a combustor in fluid communication with and disposed downstream from the compressor section; a turbine section in fluid communication with and disposed downstream from the combustor; a rotating shaft rotatable with the compressor section, the turbine section, or both; and an exhaust section in fluid communication with and disposed downstream from the turbine section.

A propulsion system defining a radial direction and an axial direction, the propulsion system comprising: a casing defining an inlet and a third stream flowpath; an unducted fan defining a fan axis, wherein the unducted fan is disposed to rotate about the fan axis relative to the casing, wherein the fan axis is offset from the inlet along the radial direction; and a turbomachine disposed downstream from the unducted fan along the radial direction, wherein the turbomachine defines a working gas flowpath, wherein the propulsion system defines an inlet passage fluidly connected to the inlet, wherein the inlet passage is configured to provide an inlet airflow to the working gas flowpath and to the third stream flowpath, and wherein the third stream flowpath bypasses at least a portion of the turbomachine.

The propulsion system of one or more of these clauses, wherein the unducted fan comprises a plurality of fan blades, the propulsion system further comprising a row of stationary guide vanes disposed downstream from the unducted fan and upstream from the inlet.

The propulsion system of one or more of these clauses, wherein the turbomachine comprises a compressor section having a mid-fan, wherein the third stream flowpath is configured to receive a portion of the inlet airflow from the inlet passage at a location downstream of the mid-fan.

The propulsion system of one or more of these clauses, wherein the turbomachine comprises a compressor section having a mid-fan, wherein third stream flowpath defines a third stream inlet having a radial height, wherein the mid-fan defines a blade span, and wherein the radial height of the third stream inlet is at least 5% of the blade span of the mid-fan and up to 50% of the blade span of the mid-fan.

The propulsion system of one or more of these clauses, wherein the turbomachine comprises a compressor section having a mid-fan, wherein the propulsion system comprises an inlet surface defining in part the inlet passage, wherein the inlet surface defines a curvature comprising an inflection point disposed at a point along the curvature.

The propulsion system of one or more of these clauses, wherein the curvature of the inlet surface includes a first portion and a second portion, wherein the first portion is concave-up, wherein the second portion is concave-down, wherein the inflection point is located at a transition point of the first portion that is concave-up and the second portion that is concave-down.

The propulsion system of one or more of these clauses, wherein the inlet defines an inlet centerline axis, wherein the inlet centerline axis of the inlet is non-coaxial with the fan axis.

The propulsion system of one or more of these clauses, wherein the inlet is a single inlet or a plurality of inlets that do not circumscribe or surround the fan axis.

The propulsion system of one or more of these clauses, wherein the inlet is a single inlet or a plurality of inlets that are proximal a shaft axis and distal a fan axis.

We claim:

1. A propulsion system comprising:
   an unducted rotating fan defining a fan axis; and
   a turbomachine disposed downstream from the unducted rotating fan, wherein the turbomachine defines a working gas flowpath flowing therethrough;
   wherein the propulsion system defines a third stream flowpath and an inlet passage having an inlet that is offset from the fan axis, wherein the inlet passage is configured to provide an inlet airflow to the working gas flowpath, and wherein the third stream flowpath bypasses at least a portion of the turbomachine, and
   wherein the turbomachine comprises a mid-fan, wherein the third stream flowpath defines a third stream inlet having a radial height, wherein the mid-fan defines a blade span, and wherein the radial height of the third stream inlet is at least 5% of the blade span of the mid-fan and up to 50% of the blade span of the mid-fan.

2. The propulsion system of claim 1, wherein the propulsion system further comprises:
   a gearbox operably coupled to the unducted rotating fan; and
   a rotating shaft extending from the turbomachine and connected to the gearbox, wherein the gearbox is operably coupled to the turbomachine via the rotating shaft, wherein the rotating shaft defines a shaft axis.

3. The propulsion system of claim 2, wherein the rotating shaft is offset from the fan axis such that the rotating shaft is disposed at a first distance from the fan axis.

4. The propulsion system of claim 1, wherein the turbomachine comprises a compressor section having the mid-fan with a mid-fan blade, wherein the propulsion system comprises an inlet surface defining in part the inlet passage, wherein the inlet surface defines a curvature comprising an inflection point disposed at a point along the curvature.

5. The propulsion system of claim 1, wherein the propulsion system comprises an inlet surface defining in part the inlet passage, wherein the inlet surface defines a curvature, wherein the curvature comprises an inflection point, wherein the curvature of the inlet surface includes a first portion and a second portion, wherein the first portion is concave-up, wherein the second portion is concave-down, wherein the inflection point is located at a transition point of the first portion that is concave-up and the second portion that is concave-down.

6. The propulsion system of claim 1, wherein the inlet of the inlet passage defines a non-annular shape.

7. The propulsion system of claim 1, wherein the propulsion system defines a forward direction and a rearward direction, wherein the unducted rotating fan is configured to push a fan stream in the rearward direction, wherein at least a portion of the turbomachine is disposed in a reverse flow arrangement such that the turbomachine is configured to direct a portion of the working gas flowpath in the forward direction.

8. The propulsion system of claim 1, further comprising a row of stationary guide vanes disposed downstream from the unducted rotating fan and upstream from the turbomachine.

9. The propulsion system of claim 1, wherein the third stream flowpath is configured to receive a portion of the inlet airflow from the inlet passage at a location downstream of the mid-fan.

10. The propulsion system of claim 1, wherein the turbomachine comprises a compressor section having the mid-fan and a high pressure compressor, wherein the third stream flowpath is configured to receive a portion of the inlet airflow from the inlet passage at a location downstream of the mid-fan and upstream of the high pressure compressor.

11. The propulsion system of claim 10, wherein the third stream flowpath defines a third stream inlet, wherein the third stream inlet is a non-annular inlet.

12. The propulsion system of claim 1, wherein the turbomachine further comprises:
   a combustor in fluid communication with and disposed downstream from the compressor section;
   a turbine section in fluid communication with and disposed downstream from the combustor;
   a rotating shaft rotatable with the compressor section, the turbine section, or both; and
   an exhaust section in fluid communication with and disposed downstream from the turbine section.

13. A propulsion system defining a radial direction and an axial direction, the propulsion system comprising:
   a casing defining an inlet and a third stream flowpath;
   an unducted fan defining a fan axis, wherein the unducted fan is disposed to rotate about the fan axis relative to the casing, wherein the fan axis is offset from the inlet along the radial direction; and
   a turbomachine disposed downstream from the unducted fan along the radial direction, wherein the turbomachine defines a working gas flowpath, wherein the propulsion system defines an inlet passage fluidly connected to the inlet, wherein the inlet passage is configured to provide an inlet airflow to the working gas flowpath and to the third stream flowpath, and wherein the third stream flowpath bypasses at least a portion of the turbomachine,
   wherein the turbomachine comprises a compressor section having a mid-fan, wherein the third stream flowpath defines a third stream inlet having a radial height, wherein the mid-fan defines a blade span, and wherein the radial height of the third stream inlet is at least 5% of the blade span of the mid-fan and up to 50% of the blade span of the mid-fan.

14. The propulsion system of claim 13, wherein the unducted fan comprises a plurality of fan blades, the propulsion system further comprising a row of stationary guide vanes disposed downstream from the unducted fan and upstream from the inlet.

15. The propulsion system of claim 13, wherein the third stream flowpath is configured to receive a portion of the inlet airflow from the inlet passage at a location downstream of the mid-fan.

16. The propulsion system of claim 13, wherein the turbomachine comprises a compressor section having a mid-fan, wherein the propulsion system comprises an inlet surface defining in part the inlet passage, wherein the inlet surface defines a curvature comprising an inflection point disposed at a point along the curvature.

17. The propulsion system of claim 16, wherein the curvature of the inlet surface includes a first portion and a second portion, wherein the first portion is concave-up, wherein the second portion is concave-down, wherein the inflection point is located at a transition point of the first portion that is concave-up and the second portion that is concave-down.

18. The propulsion system of claim 13, wherein the inlet defines an inlet centerline axis, wherein the inlet centerline axis of the inlet is non-coaxial with the fan axis.

* * * * *